H. D. WILLIAMS.
GEAR CUTTING TOOL.
APPLICATION FILED SEPT. 14, 1916.
1,313,034.
Patented Aug. 12, 1919.
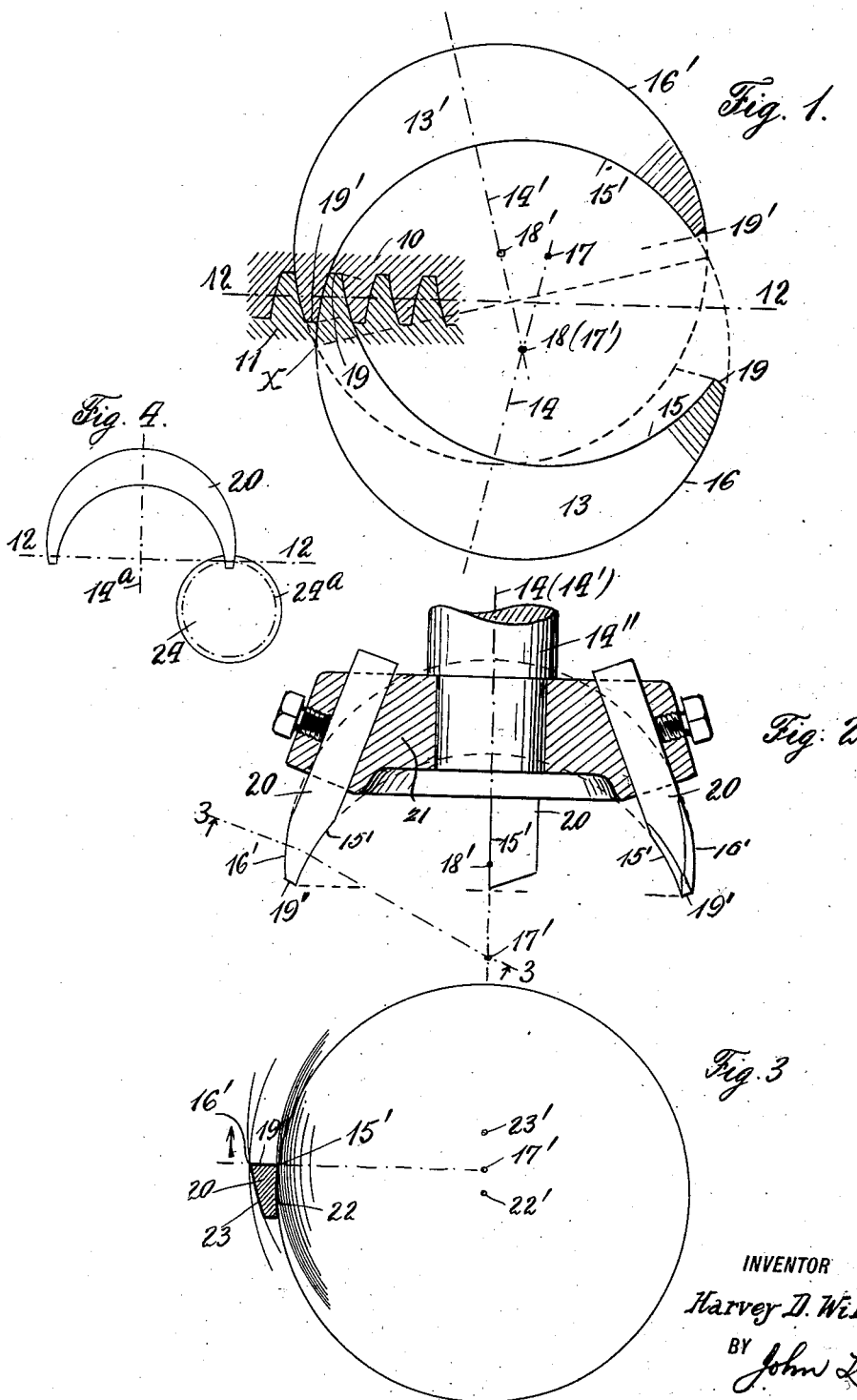
INVENTOR
Harvey D. Williams
BY John Lotka
ATTORNEY

UNITED STATES PATENT OFFICE.

HARVEY D. WILLIAMS, OF WALLINGFORD, CONNECTICUT, ASSIGNOR, BY MESNE ASSIGNMENTS, TO JAMES E. GLEASON, TRUSTEE, OF ROCHESTER, NEW YORK.

GEAR-CUTTING TOOL.

1,313,034.    Specification of Letters Patent.    Patented Aug. 12, 1919.

Application filed September 14, 1916. Serial No. 120,087.

*To all whom it may concern:*

Be it known that I, HARVEY D. WILLIAMS, a citizen of the United States, and a resident of Wallingford, in the county of New Haven and State of Connecticut, have invented certain new and useful Improvements in Gear-Cutting Tools, of which the following is a specification.

My present invention relates to the cutting of gear teeth of longitudinal curvature, both spur and bevel, and has for its object providing cutting tools of a character to more economically and more perfectly produce gears having the highest operative qualities. For this purpose I employ cutting tools having cutting edges which sweep out geometric surfaces that have a spherical curvature. I thereby secure important advantages both in the cutting of gears made according to the "master form" principle and in the cutting of gears of an interchangeable series. The gears so cut are fully described and claimed in another application filed by me June 11, 1918, Serial No. 239,354.

I provide for cutting such gears, tools having cutting edges to cut simultaneously two sides of a tooth and the bottom of a space, and that one cutting edge should be convex and another concave.

For cutting "master form" gears in accordance with my said copending application Serial No. 239,354 I employ tools of the same general character as herein set forth. The manner in which they are employed is different for the two mating gears, one of them having surfaces of single reproduction configuration and the other surfaces of double reproduction configuration as fully described in said copending application.

For cutting gears of an interchangeable series I may employ the same tool for cutting both members of any given meshing pair of gears. The blank being cut has a rolling motion with respect to the axis of the cutter as of the pitch cone of the blank rolling on the pitch plane of a rack. Heretofore such methods have been limited to the cutting of only one side of a tooth at a time whereas by my novel and combined cutting edges I gain the very important advantage of cutting two sides simultaneously and without of course, any resetting of the tool. My tool edges also have the further advantage of being easily kept ground.

Interchangeable gears with longitudinally-curved teeth are interchangeable in a necessarily restricted sense. Thus it is impossible to have a single series of such gears any one of which will mesh with any other of the series. Instead of this, there will be a right-hand series and a left-hand series any one of the former of which will mesh with any one of the latter.

The peculiarity of curved teeth, together with other related facts, are readily to be inferred from considerations of the shape of the rack (or crown-gear) which is the basis of derivation of the interchangeable series. If the rack (or the crown-gear) and the reverse (cast or impression) thereof are alike, the derived gears will constitute a single series. But if the rack (crown gear) and its reverse are different (rights and lefts), there will be two series of which no two gears of the same series will mesh, while any gear of the one series will mesh with any gear of the other as stated above. There are two ways in which the rack (crown gear) and its reverse may differ, and corresponding to these are differences in the derived gears.

The rack and its reverse may differ in that, while the product of identically the same cutter, that cutter must operate in positions which are respectively right and left handed. In this case the one cutter will cut all the teeth on both series of gears, but it will operate in a right-handed position for one series, and in a left-handed position for the other series. Or the rack (crown gear) and its reverse may differ in that their production requires two different cutters, as for example when the mating gears derivable from the rack are to have teeth differing in thickness.

The principles as stated above are of quite general application, being true generally of spur and bevel gearing having teeth radial or straight, skewed or curved or twisted in any manner; included in this list for example is the helical spur gear.

The improved cutter which forms the subject-matter of my present application is of the rotary character, and is capable of cutting spur or bevel gears with longitudinally-curved teeth (interchangeable in the restricted sense explained above), and also, in its preferred form of construction, capable of cutting both sides and the bottom of a space at once. The cutter is also capable of being renewed by regrinding its tools an indefinite number of times, by means of a grinding wheel which is self-dressing or self-sharpening.

A specific example of my invention (to which however I do not wish to restrict myself) is shown in the accompanying drawings, in which Figure 1 is a diagram illustrating the theoretical shape of the cutter, and the two positions given to this cutter or tool for the cutting of right-handed and left-handed gears respectively; Fig. 2 is a side view of the cutter as it might be made in actual practice, with parts in axial section; however, for the sake of clearness, Fig. 2 indicates a smaller number of tools on the cutter than would be used in practice; Fig. 3 is a section substantially on line 3—3 of Fig. 2; and Fig. 4 is a diagram showing the use of such a cutter for generating spur teeth of longitudinal curvature.

In Fig. 1, 10 represents the rack or crown gear and 11 is the reverse thereof, which in this case are shown as of the same shape. 12 is the pitch line of the rack or the pitch plane of the crown gear. 13 shows in axial or meridian section the cutter for cutting the rack 10, said cutter rotating about the axis 14 and having a concave cutting edge 15 and a convex cutting edge 16 whose respective centers 17 and 18 are on the cutter axis 14. The cutter also has transverse bottom-cutting edges 19. As the edges 15, 16 are curved according to arcs of circles whose centers are on the axis of rotation 14, it follows that the surfaces swept out by these edges are portions of spherical surfaces. If we assume the cutter 13 to rotate about a stationary axis while at the same time the blank (10) is rolled so that its pitch-cylinder, in the case of a spur-gear (or its pitch-cone, in the case of a bevel gear) will roll on the one case (spur gear) on the pitch line 12 of the rack, or in the other case, on the pitch plane of the crown gear, which plane is also represented by the line 12, the rotation of the cutter, in conjunction with the rolling motion of the blank, will produce the tooth-surfaces of the desired character.

If the cutter is given the position indicated at 13', so that the center 17' of the edge 15' will coincide with the previous position of the center 18 of the edge 16, and the one edge 19 will take the position indicated at 19' at the bottom of the tooth-space of the reverse rack 11, this will result in a position of the cutter symmetrical to its first position, with reference to the line or plane 12; that is to say, the axes 14, 14' will form the same angle with the line 12, but in opposite directions. If the same operation of rotating the cutter and simultaneously rolling the blank 11 along the line or plane 12, is then repeated with the cutter in the position 13', I will obtain a gear with tooth-surfaces of a formation analogous to those obtained with the tool in the first position, except that the tooth surfaces will be left-handed in one case and right-handed in the other.

In practice the convex and concave edges will be formed on separate tools such as 20 Figs. 2 and 3, the dotted lines showing a greater extent of circular arc, the upper part of the arc being discarded since it does not cut. These tools are secured in any suitable manner to a holder or cutter head 21, which will carry as many tools as possible, say twelve or more, but for the sake of clearness Fig. 2 has been drawn as if the cutter head 21 (secured to shaft 14) had only four tools 20. Each tool 20 is shown as made with a concave cutting edge and with a convex cutting edge.

The three edges 15, 16, 19 of the same tool 20 are preferably located in the same axial or meridian plane, as shown. However, this is not absolutely necessary. As regards the convex and the concave cutting edges, while they have been shown as arcs of circles centered upon the cutter axis (this being the simplest form), it will be obvious that the edges will perform the same cutting action (substantially) as long as they are located entirely upon geometrical spheres centered on the cutter axis, but do not lie entirely in planes perpendicular to the cutter axis. In other words, all the points of the same curved (convex or concave) cutting edge should be at the same distance from a certain point on the cutter axis (the corresponding sphere center), but they should not be all at the same distance from the cutter axis, but at different distances therefrom.

Fig. 3 also shows a preferred construction of the two clearance surfaces 22, 23 which lie in the rear of the cutting edges 15 (15') and 16 (16') respectively. The inner clearance surface 22 is shown as a portion of a sphere whose center is at 22', and the outer surface 23 as a portion of a sphere whose center is at 23'. These centers 22', 23' are shown as lying in a straight line with the center 17' of the sphere swept by the cutter edges 15'. Thus the cutter edge 15 will lie at the intersection of two spheres, and the same will be true with reference to the other (convex) edge 16. This formation of the clearance surfaces facilitates keeping the tool in proper condition by means of suitable grinding wheels.

The point, X, of intersection of the two circles 15 and 16, represents a point in the circular line of intersection of two intersecting geometric spheres of which, respectively, said circles 15', 16' are, preferably, great circles; and, hence, a pair of adjacent and non-generated tooth-surfaces as swept out by the profile edges 15' and 16' of the tool (Fig. 3) correspond to two adjacent zones of the said geometric spheres, and are located near to and on the same side of said circle of sphere intersection.

For cutting bevel gears according to the principles explained above, the tool of the character described may be fitted in a machine of a construction such as shown in British Patent No. 18,658 of August 13th, 1914, by simply substituting my improved cutter or cutter-head for the one illustrated in said patent. Of course, other machines might be employed for producing the requisite rotation of the tool and relative rolling motion of the blank. For cutting spur gears, I might employ an arrangement such as indicated diagrammatically in Fig. 4, where the blank 24 rolls slowly as of its pitch circle 24ᵃ on the pitch line on the rack 12 while the tool 20 revolves rapidly about an axis 14ᵃ in offset relation to said blank.

The tools 20 are preferably at equal angular distances say 30° when there are 12 tools.

It is obvious that instead of putting the convex and concave cutting edges on one tool it would be possible to cut mating tooth surfaces by using two cutters each having one of such cutting edges.

What I claim as my invention, is:

1. A gear tooth cutter having two cutting edges, one convex and the other concave and both intersecting a plane perpendicular to the axis of rotation.

2. A gear tooth cutter having two curvilinear cutting edges of equal radii of curvature, one convex and one concave and both intersecting a plane perpendicular to the axis of rotation.

3. A gear tooth cutter having two circular cutting edges of equal radii, one convex and one concave and both intersecting a plane perpendicular to the axis of rotation.

4. A gear tooth cutter having two cutting edges, all points of which lie on the surfaces of geometric spheres, one edge being convex and the other concave.

5. A rotary gear-tooth cutter having a cutting edge curved according to the arc of a circle whose center is on the cutter axis.

6. A rotary gear-tooth cutter having two cutting edges, one convex and the other concave, and both curved according to arcs of circles whose centers are on the cutter axis.

7. A rotary gear-tooth cutter having two cutting edges, one convex and the other concave, and both curved according to arcs of circles whose centers are on the cutter axis, and a bottom-cutting edge transverse to said two edges.

8. A rotary gear-tooth cutter having two cutting edges, one convex and the other concave, and both curved according to arcs of circles whose centers are on the cutter axis, and a bottom-cutting edge transverse to said two edges and located in a section of an element of a cone whose axis is the cutter axis.

9. A rotary gear-tooth cutter having a plurality of similar cutting tips located at equal distances from the cutter axis and provided with cutting edges curved according to circular arcs centered on the cutter axis.

10. A rotary gear tooth cutter having a plurality of similar cutting tips located at equal distances from the cutter axis and also at equal angular distances from each other, said cutter tips being provided with cutting edges curved according to circular arcs centered on the cutter axis.

11. A rotary gear-tooth cutter having a cutting edge the points of which are equidistant from a certain point on the cutter axis but at varying distances from said axis.

12. A rotary gear-tooth cutter having a concave cutting edge and a convex cutting edge both located in a plane passing through the cutter axis and both intersecting a plane perpendicular to the axis of rotation.

13. A rotary gear cutter which has circular arc edges, one convex and one concave relatively to the cutter axis and having their centers at different points on said axis.

14. A rotary gear cutter having a convex cutting edge curved according to the arc of a circle whose center is on the cutter axis.

15. A rotary gear cutter having a concave cutting edge curved according to the arc of a circle whose center is on the cutter axis.

16. A rotary cutter having a cutting edge which intersects a plane perpendicular to the axis of rotation and lies on a geometrical sphere the center of which is on the cutter axis.

17. A rotary cutter having a cutting edge which intersects a plane perpendicular to the axis of rotation and forms part of a meridian of a geometric sphere the center of which is upon the cutter axis.

18. A rotary cutter having a concave cutting edge which intersects a plane perpendicular to the axis of rotation.

19. A rotary cutter having a cutting edge which intersects a plane perpendicular to the axis of rotation and is formed according to a curve the concavity of which faces said axis.

20. A rotary cutter having two cutting edges situated at different distances from the axis of rotation, each of said edges intersecting a plane perpendicular to said axis, and being formed according to a curve the concave side of which faces toward said axis.

21. A rotary cutter having two cutting edges situated at different distances from the axis of rotation, one of said edges being convex and the other concave.

In testimony whereof I have signed this specification.

HARVEY D. WILLIAMS.

Witnesses:
 FRANCIS H. RICHARDS,
 WM. L. HARRISON.